United States Patent [19]

Wilkinson et al.

[11] Patent Number: 5,219,684
[45] Date of Patent: Jun. 15, 1993

[54] ELECTROCHEMICAL CELLS CONTAINING A SAFETY ELECTROLYTE SOLVENT

[75] Inventors: David Wilkinson, North Vancouver; George Thomas, New Westminster; James Dudley, Port Moody; Perry Juric, Vancouver, all of Canada

[73] Assignee: Her Majesty the Queen in right of Canada, as represented by the Province of British Columbia, Canada

[21] Appl. No.: 524,175

[22] Filed: May 16, 1990

[51] Int. Cl.$^5$ .............................................. H01M 6/14
[52] U.S. Cl. .................................. 429/197; 429/224
[58] Field of Search ............... 429/194, 218, 224, 197, 429/196

[56] References Cited

U.S. PATENT DOCUMENTS

| | | | |
|---|---|---|---|
| 4,401,737 | 8/1983 | Joshi | 429/218 |
| 4,690,877 | 9/1987 | Gabano et al. | 429/194 |
| 4,863,817 | 9/1989 | Ogino et al. | 429/224 X |
| 4,959,282 | 9/1990 | Dahn et al. | 429/224 |

FOREIGN PATENT DOCUMENTS 62-29070 2/1987 Japan .

OTHER PUBLICATIONS

In re Leonard Kaplan and Wellington Epler Waler, Appeal No. 85-2522, United States Court of Appeals, Federal Circuit, May 6, 1986, 789 F.2d 1574, 229 U.S.-P.O. 678 (Fed. Cir. 1986).

*Primary Examiner*—Anthony Skapars
*Attorney, Agent, or Firm*—Lerner, David, Littenberg, Krumholz & Mentlik

[57] ABSTRACT

The present invention is an electrolyte which provides superior safety characteristics on cells using the electrolyte. The electrolyte allows for the preparation of cells having acceptable performance when placed in environments where safety concerns are paramount.

5 Claims, No Drawings

ELECTROCHEMICAL CELLS CONTAINING A SAFETY ELECTROLYTE SOLVENT

FIELD OF THE INVENTION

The present invention is directed to electrochemical cells and to electrolyte solvents useful in such cells.

BACKGROUND OF THE INVENTION

The electrochemical cells of non-aqueous storage batteries typically include an anode including an alkali metal such as lithium. The anode metal may be present as a pure metal or alloy, or else may be releasably intercalated in a material such as carbon. The cell further includes a liquid electrolyte solution containing an electrolyte salt which is preferably a compound of the anode metal and which is dissolved in one or more organic solvents; and a cathode of an electrochemically active material, also referred to as a cathode-active material. The cathode-active material typically is a chalcogenide of a transition metal. During discharge, alkali metal ions from the anode pass through the liquid electrolyte solution to the cathode-active material of the cathode where the ions are taken up, with the release of electrical energy. During charging, the current flow of ions is reversed. Alkali metal ions pass from the electrochemically active or cathode-active material of the cathode through the electrolyte solution to the anode.

Cells incorporating lithium as the anode metal provide high energy density. That is, such cells can store substantial amounts of electrical energy for a given size. Manganese dioxide is a promising cathode-active material for such lithium-based cells. $MnO_2$ provides a high electrochemical potential against lithium, and hence a high energy density. Moreover, it is low in cost and readily available. Therefore, considerable effort has been devoted to development of cells using lithium as the anode metal and $MnO_2$ as the cathode-active material. In particular, considerable effort has been devoted to development of $Li_x/MnO_2$ cells which can be repeatedly charged and discharged, commonly referred to as "secondary" cells.

If the cell charging process is continued beyond the desired fully charged condition, then irreversible damage can occur. The voltage across the cell depends upon the existing state of charge of the cell. At any given state of charge the cell has a corresponding voltage or potential. Accordingly, a damaging overcharge can be prevented by terminating the charging cycle when the voltage across the cell reaches the charge potential corresponding to the desired fully charged state.

If cycling continues, irreversible damage may occur in the cell, ruining the cell. In some cases, a hazardous situation can occur as the cells is driven beyond safe limits of operation such as, for example, overcharging. These hazardous situations are thought to result from undesirable reactions which may occur when the cell is subjected to abuse such as overcharging or operation at abnormally high temperatures.

One such undesired reaction is the reaction of the anode material with the electrolyte solvent. The problem is most acute in secondary cells, and particularly in secondary cells having an alkali metal anode as alkali metals are generally quite reactive. As cells are repeatedly cycled, the surface area of the anode, particularly those anodes made of metallic lithium, increases with repeated plating of lithium from the electrolyte onto the anode during recharge. The electrolyte-lithium contact surface area likewise increases. This generally reduces the tolerance of the cells to thermal and electrical abuse. It has been shown that very high surface area lithium is generated in cycling duty cycles with a small discharge current. The increased surface area tends to promote reaction between the anode metal and the electrolyte solvent.

Furthermore, reactions between the electrolyte solvent and the anode are generally exothermic, providing heat which merely drives the reaction further. The heat and gasses generated by such reactions can raise the pressure within the cell to the point where the cell casing ruptures, as by the opening of an overpressure relief device incorporated in the casing wall. This is commonly referred to as "venting." Venting releases the electrolyte from the cell, effectively terminating the useful life of the cell. Moreover, the vented materials may contaminate the surrounding equipment and can pose a safety hazard under some conditions.

These problems may be particularly acute in batteries with lithium anodes because lithium has a melting point of only about 180° C. It is therefore possible to generate temperatures inside the battery as a result of electrolyte reaction when the battery is subjected to abnormal operation in an environment at an elevated temperature or overcharging which can lead to melting of the anode. Melting of the lithium can result in internal short circuit, leading to sudden release of electrochemical energy as heat, and hence to violent venting. Cells which short circuit or which exhibit forced discharge, the latter of which can occur when a low capacity cell is discharged within a series of cells with normal capacity, may also exhibit similar problems.

Another problem facing electrochemical cell designers is that of trading off performance for safety. For example, certain formulations of electrolyte solutions may be "safe" when used in a $Li_x/MnO_2$ cell in that they do not cause violent venting. However, these same cells may exhibit Type 1 venting after a relatively low number of cycles. Type 1 venting refers to a moderate venting condition in which the opening of the cell safety vent occurs to relieve generated pressure in a controlled manner. While no flame or exothermic thermal runaway occurs in type 1 venting, the electrolyte may leak from the cell and may be toxic or may degrade the plastics used in battery pack housings. As such, these cells exhibit poor performance and their useful life may be extremely limited and they may pose a slight safety risk. Other types of venting include: Type 2 venting which involves the opening of the cell vent accompanied by a mild flame; Type 3 venting which involves the opening of the cell vent accompanied by vigorous flame of up to 30 cm in length; and Type X venting in which there is insufficient time for the cell vent to open and violent explosion results. These latter venting conditions pose a more considerable safety risk. This classification system is sometimes used in the industry as a way of describing the reaction of cells when abused.

The industry has long searched for solutions to these problems. See, for example, Japanese Patent Application [Kokai] No. JP64-14879 (1989) and German Patent No. DE 3,024,151 (relating to a different electrode systems.) However, these attempts have failed to be completely satisfactory.

Therefore, there remains a need for an electrolyte solvent which has dramatically reduced reaction propensities within lithium batteries but which nonetheless provides acceptable performance.

SUMMARY AND OBJECTIVES OF THE PRESENT INVENTION

It is, therefore, an objective of the present invention to provide a safety electrolyte solvent having a greatly reduced reactivity with the anode material of a lithium battery.

It is also an object of the present invention to provide an electrochemical cell which combines good safety with acceptable performance characteristics, particularly where the cell's environment is anticipated to be harsh and safety is paramount.

In accordance with one aspect of the present invention an electrochemical cell comprising a lithium-containing anode, a cathode including a $MnO_2$ cathode-active material, a separator, and an electrolyte solution of an electrolyte salt dissolved in a safety electrolyte solvent consisting essentially of sulfolane and a glyme selected from the group consisting of triglymes and tetraglymes and mixtures thereof is provided. $MnO_2$ may also be represented, for the purposes of the present invention, as $Li_xMnO_2$ where Li refers to the lithium taken up by the cathode-active material and "x" refers to the amount of lithium taken up.

The present invention includes the realization that specific glymes, when combined with sulfolane, provide an electrolyte solvent particularly well-suited for use in $Li/MnO_2$ electrochemical cells, especially secondary $Li/MnO_2$ cells. In the preferred cells according to the present invention, the electrolyte solution provides low reactivity with lithium along with other acceptable performance characteristics, such as cycle life, discharge rate capability, storage stability, and low cost, and hence provides a hitherto unattainable combination of benefits. The solvent of the present invention has a very low reactivity with the lithium anode and electrolyte salts in a lithium battery of the claimed construction.

The discovery that the particular combination of the aforementioned specific glymes and sulfolane provides such a combination of performance and safety is particularly unexpected in that many closely related materials are very poor electrolytes for $Li/MnO_2$ cells. For example, electrochemical cells containing a mixture of methyl monoglyme (also known as dimethoxyethane or "DME") and sulfolane as the electrolyte solvent generate large amounts of gas during normal cycling at 55° C. and undergo Type 1 venting after about four cycles. Cells with sulfolane/ethyl monoglyme and ethyl diglyme solvents exhibit a cycle life of less than 20 cycles at 25° C., which is far below practical performance levels. Furthermore, a 3-methyl sulfolane when combined with a glyme does not show the same safety enhancement characteristics as an unsubstituted sulfolane when used in a $Li/MnO_2$ cell electrolyte solvent according to the present invention.

Moreover, unsubstituted sulfolane alone is not practical as an electrolyte solvent. Sulfolane freezes at 28° C. In the presence of an electrolyte salt, sulfolane may remain fluid to 0° C. but the salts precipitate out of solution below 0° C. Therefore, a major aspect of the present invention is the realization that the mixture of sulfolane with specific glymes will produce a battery which has sufficient safety characteristics, as well as performance properties which would allow for its practical use.

As previously discussed, batteries or electrochemical cells produced in accordance with the present invention and utilizing the safety electrolyte solvent of the present invention have improved safety characteristics and are generally useful throughout a wide range of temperatures and environments. Through the use of the present invention, one is not forced to choose between batteries which are safe and those which are generally useful, even at, for example, lower temperatures.

DETAILED DESCRIPTION OF THE PREFERRED EMBODIMENTS

Sulfolane has an empirical formula $C_4H_8O_2S$ and is a cyclic based 5-membered ring containing a single sulfur and the four carbons, the sulfur being double-bound to each of the oxygens. Sulfolane is also commonly known as tetramethyl sulfolane, tetramethylene sulfolane, and tetrahydrothiophen-1,1-dioxide. The term "sulfolane" as used in this disclosure should be understood as referring only to the unsubstituted sulfolane.

Glyme is a generic name for a family of glycoldiethers having the basic formula $RO-(C_2H_4O)_nR^1$ where "n" is generally between 1 and about 20 and "R" and "$R^1$" may be the same or different, and generally include short-chain normal alkanes. A monoglyme has an "n" of 1, a diglyme has an "n" of 2, a triglyme has an "n" of 3, a tetraglyme has an "n" of 4, and so on. Dimethoxy ethane, also known as methyl monoglyme or DME, has a formula $CH_3OC_2H_4OCH_3$. Diethoxy ethane or ethyl monoglyme has a formula $C_2H_5OC_2H_4OC_2H_5$. Methyl triglyme has a formula of $CH_3O(C_2H_4O)_3CH_3$. Methyl tetraglyme has a formula $CH_3O(C_2H_4O)_4CH_3$.

The safety electrolyte solvent preferably includes between about 25 and about 90% sulfolane based on the total solvent volume, the balance being methyl-triglyme or methyl-tetraglyme, or mixtures thereof in accordance with the present invention. Most preferably, however, the electrolyte and safety electrolyte solvent of the present invention comprises sulfolane and a glyme in accordance with the present invention in a ratio of about 1 to 1 by volume.

With respect to other cell components, the electrochemically active material or cathode-active material of which the cathode preferably is composed is lithiated $MnO_2$ in particulate form, the particles of which may be attached by a polymeric binder to each other and to a metallic current collector. The cell cathode normally is spaced from the anode with a non-conductive polymeric electrode separator, and both electrodes are in contact with the non-aqueous safety electrolyte solution of the present invention.

The anode typically includes a composition containing the alkali metal in a form such that the alkali metal can be reversibly taken up and released by the anode during charge and discharge. Thus, the anode may include the pure alkali metal or an alloy of the alkali metal with other metals, such that the alkali metal can be stripped from the anode during discharge and plated onto the anode during recharge. Alternatively or additionally, the anode may incorporate a composition capable of reversibly intercalating the alkali metal. For example, alkali metals may be reversibly intercalated in carbonaceous compositions such as coke or graphite. These compositions, with the alkali metal intercalated therein, can also be used as anodes in cells according to the present invention. The anode may also be fabricated from a sheet of substantially pure lithium foil.

The preparation of a lithiated $MnO_2$ ($Li_xMnO_2$) cathode-active material for cathode fabrication is known in the art. A particularly preferred method of making $Li_xMnO_2$ is disclosed in copending U.S. application Ser. No. 07/217,668, now U.S. Pat. No. 4,959,282, filed on Jul. 11, 1988 in the name of Dahn et al., and entitled "Cathode Active Materials, Methods Of Making Same and Electrochemical Cells Incorporating Same," the text of which is hereby incorporated by reference. The method includes providing a substantially dry intermediate including Li and gamma $MnO_2$ at a mean molar ratio of about 0.33 to about 0.43 and heat-treating said intermediate in a drying atmosphere above about 300° C.

The cathode may include the cathode-active material in particulate form, optionally with a suitable inert polymeric binder, such as the polymer of ethylene propylene base diene monomer commonly referred to as EPDM; a polyfluorinated hydrocarbon, such as polytetrafluoroethylene (PTFE); or polyethylene oxide (PEO). Preferably, about 2% weight or less of polymer to cathode-active material is used. The cathode may also include a conductive phase chemically inert material, such as carbon, through the cathode.

A safety electrolyte solution in accordance with the present invention includes an electrolyte salt dissolved in the safety electrolyte solvent of the present invention. Further in accordance with the present invention, the electrolyte salt includes the salt of the anode metal. The electrolyte salt should be compatible with both cathode and anode materials, as well as any other materials which may be present within the electrochemical cell. When the anode includes lithium, as is preferred in accordance with the present invention, suitable electrolyte salts include $LiAsF_6$, $LiPF_6$, $LiBF_4$, $LiB(C_6H_5)_4$, $LiCF_3SO_3$, $LiSO_3F$, $LiAlCl_4$, $LiBr$, $LiN(CF_3SO_2)_2$, as well as mixtures thereof. Of these, $LiAsF_6$, $LiPF_6$, $LiBF_4$, $LiN(CF_3SO_2)_2$ and mixtures thereof are preferred. Concentrations of these electrolyte salts in the electrolyte solution of the present invention are preferably between about 0.5 molar and about 1.5 molar, and are, most preferably, about 1.0 molar.

In addition to the aforementioned, the compositions in accordance with the present invention may include conventional additives such as propylene carbonate (PC), ethylene carbonate (EC), aromatic solvents such as benzene, toluene, xylene and the like, 2-methyl-tetrahydrofuran (2Me-THF), tetrahydrofuran (THF), acetonitrile, methylformate and the like. However, it should be realized that the amount of such additives may be important to the safety characteristics of the electrolyte solution. For example, the addition of about 5% by volume of EC to an electrolytic solution including 1M $LiAsF_6$ and 47.5% by volume of sulfolane and 47.5% by volume triglyme results in type 3 venting when used in cells run through a Hot Box test at 150° C. At 10% EC addition by volume, type 3 venting occured in cells run through a Hot Box test at 130° C. No type 3 venting occured in either the 130° or 150° C. Hot Box test when no EC was added to the sulfolane/triglyme (50/50) electrolyte solution. Thus, as a rule of thumb, additions of solvents or other known additives in an amount of more than about 10% by volume should be avoided where possible, as such additives may adversely affect the safety characteristics of the electrolyte solutions of the present invention. Additions of about 1% by volume will generally have no adverse effect.

In assembling a cell of the present invention, a cathode is typically fabricated by depositing a slurry of the cathode-active material, the electrically conductive inert material, the binder, and a fugitive liquid carrier on the cathode current collector, and then evaporating the carrier to leave a coherent mass in electrical contact with the current collector. The cathode assembly is then combined with the alkali-containing anode, the porous polymeric electrode separator, and the safety electrolyte solution of the present invention comprising the safety electrolyte solvent and an electrolyte salt dissolved therein.

Cells prepared in accordance with the present invention have an acceptable cycle life when compared to, for example, cells with a 1M $LiAsF_6$/PC/EC (50/50) electrolyte solution, particularly at lower discharge currents. For example, at a discharge current of about C/20 cells using the electrolyte of the present invention have a cycle life of about 15–20 cycles while cells using the PC/EC electrolyte solution have a cycle life of about 50 cycles and at a discharge rate of about C/10, the cells using the electrolyte of the present invention have a cycle life of about 25–35 cycles while cells using PC/EC electrolyte solutions have a cycle life of about 60 cycles. At a discharge current of C/2.5 the cells of the present invention have a cycle life of approximately 175 cycles. Cells used were "AA" liquid $Li/MnO_2$ cells using either 1M $LiAsF_6$/sulfolane/triglyme (50/50) electrolyte solution or 1M $LiAsF_6$/PC/EC solution and a common recharge current of 60 mA was used. This performance, coupled with the improved safety characteristics obtained by the use of the electrolyte solutions of the present invention allow for the realization of cells which may be useful in particularly dangerous environments.

The foregoing will be better understood with reference to the following Examples. These Examples are for the purpose of illustration. They are not to be considered limiting as to the scope and nature of the present invention.

EXAMPLE 1

Short-circuit Test

Spiral wound $Li/MnO_2$ "AA" size cells with polyethylene/polypropylene laminated microporous separators were assembled in the normal way and filled with a variety of electrolytes. These cells were cycled 25 times between 2.0 and 3.5 volts using a C/10 charge and discharge rate. (C/n refers to the time necessary to obtain full charge where n=hours). At the end of the test, the cells were left fully charged. The cells were then short circuited at ambient temperature through a 30 milli-ohm resistor. Cells with the following electrolytes exhibited Type 3 venting: 1M $LiAsF_6$/PC/EC 50/50, 1M $LiAsF_6$/PC/EC/2 Methyl-THF 25/25/50, 1M $LiAsF_6$/3-methyl-sulfolane and 1M $LiAsF_6$/sulfolane/ethyldiglyme 50/50. Cells with the following electrolytes did not exhibit Type 3 venting: 1M $LiAsF_6$/sulfolane, 1M $LiAsF_6$/sulfolane/benzene 50/50, 1M $LiAsF_6$/sulfolane/diglyme 50/50, 1M $LiAsF_6$/sulfolane/triglyme 50/50, 1M $LiAsF_6$/sulfolane/tetraglyme 50/50, 1M $LiAsF_6$/sulfolane/diglyme/triglyme 50/25/25.

EXAMPLE 2

Hot Box Test

Spiral wound Li/MnO$_2$ "AA" size cells were assembled and filled with a variety of electrolytes as described in Example 1. The cells were cycled as in Example 1, but were not short-circuited. Instead, the fully charged cells, after cycling, were subjected to a "hot box test" to examine self-heating characteristics of the cell in the absence of electrical abuse and the chemical reactivity of the cell components. In this test, the cells are placed in an incubator at 130° C. and held in the incubator until venting occurs. If no venting occurs in 1½ hours, the test is terminated. Cells with the following electrolytes exhibited Type 3 venting: 1M LiAsF$_6$/PE-/Ec 50/50, 1M LiAsF$_6$/2-methyl-THF, 1M LiAsF$_6$/PC/EC/2-methyl-THF 25/25/50, 1M LiAsF$_6$/triglyme, 1M LiAsF$_6$/tetraglyme, 1M LiAsF$_6$/PC/EC/diglyme 25/25/50, 1M LiAsF$_6$/PC/EC/ benzene 25/25/50, 1M LiAsF$_6$/sulfolane/2-methyl-THF 50/50, 1M LiAsF$_6$/sulfolane/benzene 50/50, 1M LiAsF$_6$/3-methylsulfolane, 1M LiAsF$_6$/3-methyl-sulfolane/toluene 50/50, 1M LiAsF$_6$/sulfolane/ethylmonoglyme 50/50, and 1M LiAsF$_6$/sulfolane/ethyldiglyme 50/50. Cells with the following electrolytes did not exhibit Type 3 venting: 1M LiAsF$_6$/sulfolane, 1M LiAsF$_6$/sulfolane/ diglyme 50/50, 1M LiAsF$_6$/sulfolane/triglyme 50/50, 1M LiAsF$_6$/sulfolane/tetraglyme 50/50, 1M LiAsF$_6$/sulfolane/diglyme/triglyme 50/25/25.

EXAMPLE 3

Cycling Test

Spiral wound "AA" size cells were wetted and filled as above. They were cycled between 2.0 and 3.5 volts at 55° C. using a C/3 discharge and a C/10 charge. Cells with the following electrolytes showed Type 1 venting during cycling: 1M LiAsF$_6$/sulfolane/DME 50/50, 1M LiAsF$_6$/sulfolane/diglyme 50/50, 1M LiAsF$_6$/sulfolane/DME/diglyme 50/25/25, 1M LiAsF$_6$/sulfolane/diglyme/triglyme 50/25/25, and 1M LiAsF$_6$/triglyme. Cells with the following electrolytes showed no venting during cycling: 1M LiAsF$_6$/PC/EC 50/50, 1M LiAsF$_6$/sulfolane, 1M LiAsF$_6$/sulfolane/triglyme 50/50, 1M LiAsF$_6$/sulfolane/tetraglyme 50/50, and 1M LiAsF$_6$/tetraglyme.

All three tests were duplicated with identical results. The only exception to the aforementioned procedures involved cells containing 1M LiAsF$_6$/sulfolane/DME(50/50) as the electrolyte. These cells exhibited Type 1 venting after only about 18 cycles. Thus, they were not able to figure into the short circuit test at all. Furthermore, the aforementioned cells tested in the hot box test were cycled about 17 times, i.e., just short of venting, and then placed in the hot box.

As will be readily appreciated from the results of these tests, the only electrolytes which did not exhibit Type 3 venting in the short circuit or Hot Box test or any venting in the cycling test were the electrolytes of the present invention. Thus, only the combination of selected glymes and sulfolane in accordance with the present invention has been found to provide the necessary degree of safety.

The principles, preferred embodiments and modes of operation of the present invention have been described in the foregoing specification. The invention which is intended to be protected herein, however, is not to be construed as limited to the particular embodiments disclosed, since these are to be regarded as illustrative rather than restrictive. Variations and changes may be made by others without departing from the spirit and scope of the invention.

We claim:

1. An electrochemical cell comprising a lithium-containing anode, a cathode including a Li$_x$MnO$_2$ cathode-active material, a separator, and an safety electrolyte solution of a lithium compound dissolved in an electrolyte solvent having acceptable safety characteristics consisting essentially of sulfolane and a glyme selected from the group consisting of methyl-triglyme, methyl-tetraglyme and mixtures thereof.

2. The electrochemical cell of claim 1, wherein said solvent comprises between about 25 and about 90% sulfolane based on the total solvent volume, with the balance being said glyme.

3. The electrochemical cell of claim 2, wherein said safety electrolyte solvent comprises about 50% sulfolane based on the total solvent volume, with the balance being said glyme.

4. The electrochemical cell of claim 1, wherein said electrolyte salt is selected from the group consisting of LiAsF$_6$, LiN(CF$_3$SO$_2$)$_2$, LiPF$_6$ LiBF$_4$, and mixtures thereof.

5. The electrochemical cell of claim 4, wherein said electrolyte salt is present in a concentration of between about 0.5 molar and about 1.5 molar based on the volume of the safety electrolyte solution.

* * * * *